US012669007B2

(12) United States Patent
Silvestrini

(10) Patent No.: US 12,669,007 B2
(45) Date of Patent: Jun. 30, 2026

(54) METHOD FOR MANUFACTURING A SLIDING GLAZING UNIT, AND SLIDING GLAZING UNIT

(71) Applicant: SAINT-GOBAIN GLASS FRANCE, Courbevoie (FR)

(72) Inventor: Laurent Silvestrini, Bussy (FR)

(73) Assignee: SAINT GOBAIN SEKURIT FRANCE, Thourotte (FR)

( * ) Notice: Subject to any disclaimer, the term of this patent is extended or adjusted under 35 U.S.C. 154(b) by 421 days.

(21) Appl. No.: 18/559,276

(22) PCT Filed: Apr. 27, 2022

(86) PCT No.: PCT/FR2022/050801
§ 371 (c)(1),
(2) Date: Nov. 6, 2023

(87) PCT Pub. No.: WO2022/234217
PCT Pub. Date: Nov. 10, 2022

(65) Prior Publication Data

US 2024/0229535 A1 Jul. 11, 2024

(30) Foreign Application Priority Data

May 7, 2021 (FR) ....................................... 2104864

(51) Int. Cl.
*E05F 11/38* (2006.01)

(52) U.S. Cl.
CPC ....... *E05F 11/385* (2013.01); *E05Y 2600/526* (2013.01); *E05Y 2900/55* (2013.01)

(58) Field of Classification Search
CPC ...................................................... E05F 11/385
See application file for complete search history.

(56) References Cited

U.S. PATENT DOCUMENTS 4,663,901 A * 5/1987 Ichinohe .................... B60J 1/17 52/716.5
4,762,904 A * 8/1988 Nakama ..................... B60J 1/17 52/716.5

(Continued)

FOREIGN PATENT DOCUMENTS

DE 20 2011 052377 U1 1/2012
JP 2009-249838 A 10/2009

(Continued)

OTHER PUBLICATIONS

International Search Report as issued in International Patent Application No. PCT/FR2022/050801, dated Aug. 3, 2022.

*Primary Examiner* — Philip C Tucker
*Assistant Examiner* — John Blades
(74) *Attorney, Agent, or Firm* — CUSHMAN PARTNERS, LLC

(57) ABSTRACT

A method for manufacturing a vehicle glazed unit a glazed unit are disclosed, wherein two pairs of foam strips are applied and attached, each to a longitudinal rim of an attachment zone, a window holder having a U-shaped part clasping a rim of the glass pane and the two pairs of foam strips, a quick-hardening plastic material is injected into the U-shaped part, between the two foam strips of each pair, and an adhesive is injected into the U-shaped part, between the two pairs.

20 Claims, 4 Drawing Sheets

(56) References Cited

U.S. PATENT DOCUMENTS

| | | | | |
|---|---|---|---|---|
| 2009/0072579 | A1* | 3/2009 | Mori ..................... | E05F 11/385<br>49/506 |
| 2017/0284140 | A1* | 10/2017 | Sase ...................... | E05F 11/385 |
| 2018/0094468 | A1 | 4/2018 | Stewart et al. | |
| 2022/0185078 | A1* | 6/2022 | Wakabayashi ........ | E05F 11/385 |

FOREIGN PATENT DOCUMENTS

| | | | |
|---|---|---|---|
| WO | WO 2005/98187 | A1 | 10/2005 |
| WO | WO 2008/074819 | A1 | 6/2008 |

* cited by examiner

[Fig. 1]
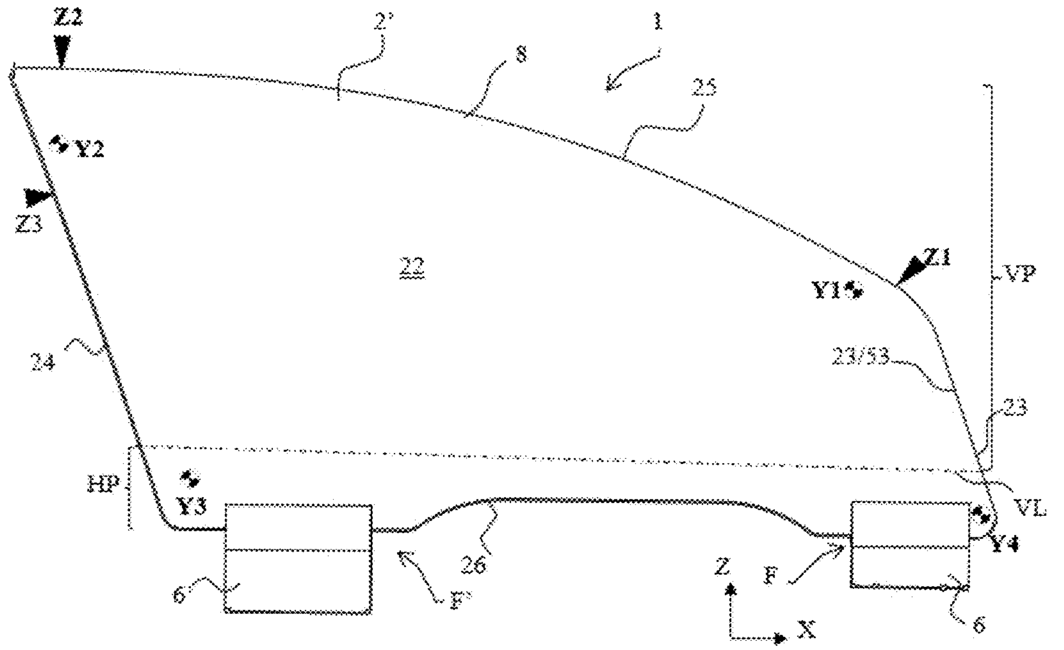
[Fig. 2]
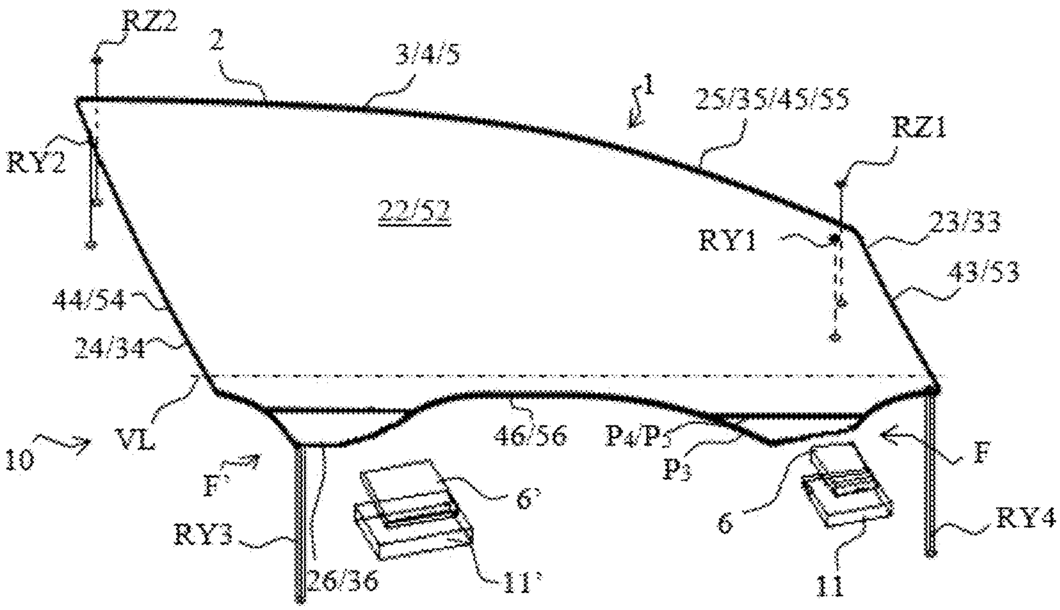

[Fig. 3]
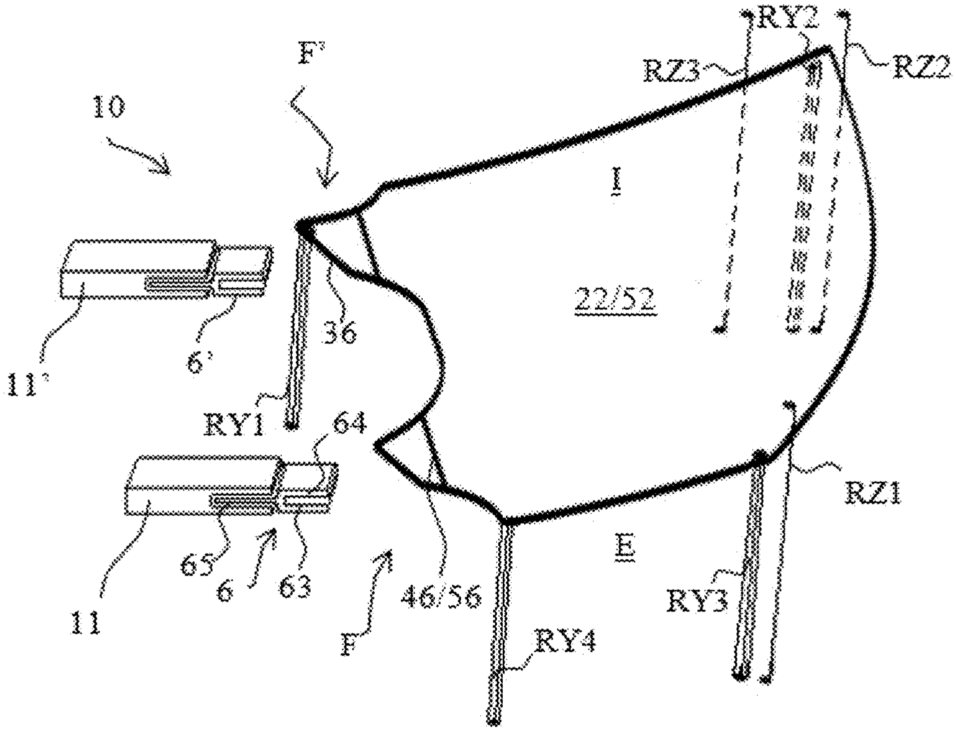
[Fig. 4]
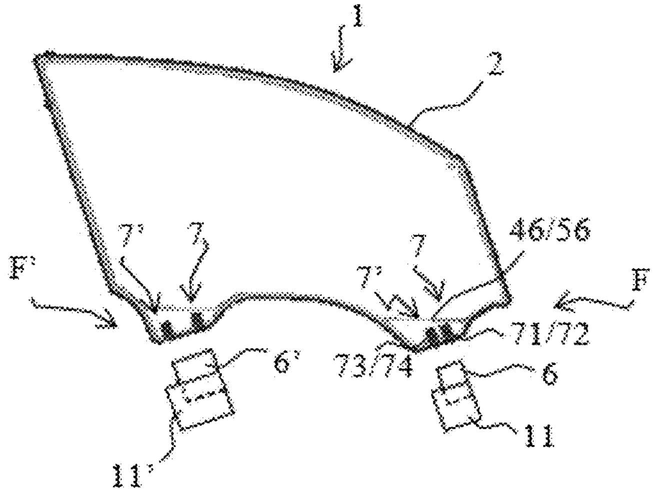

[Fig. 5]
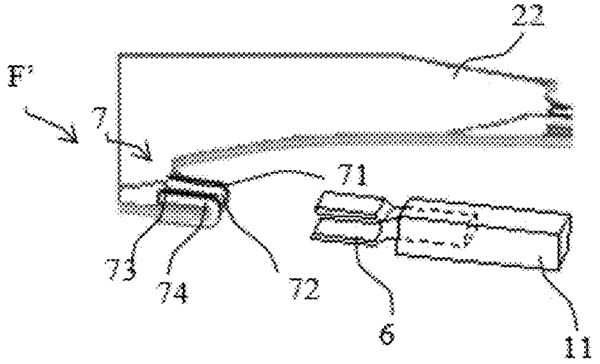
[Fig. 6]
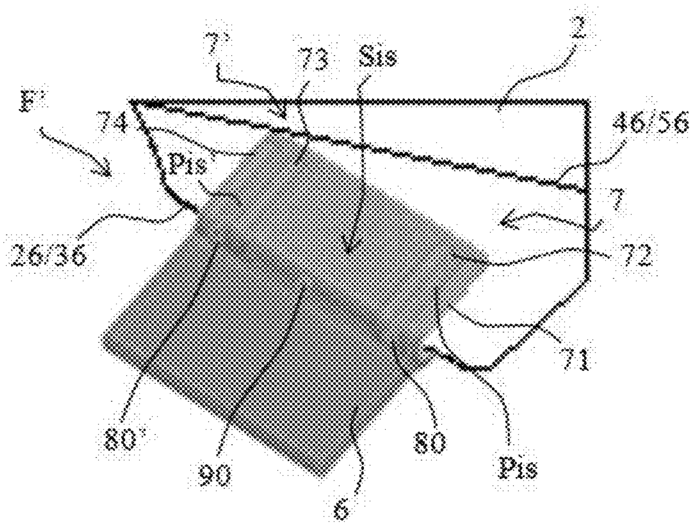
[Fig. 7]
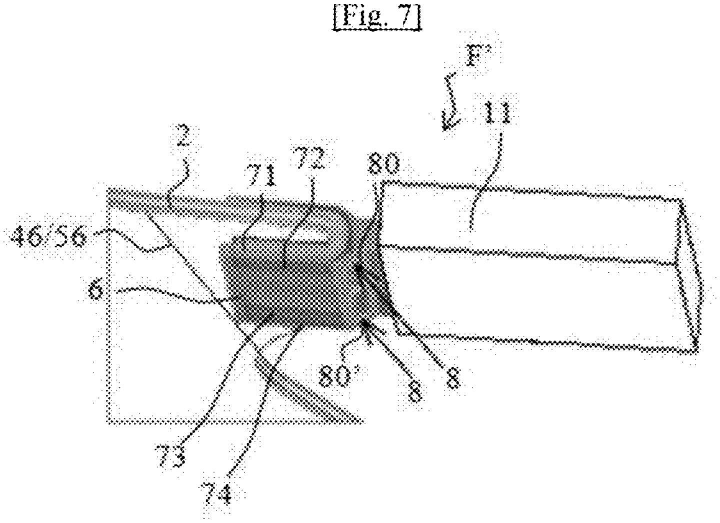

[Fig. 8]
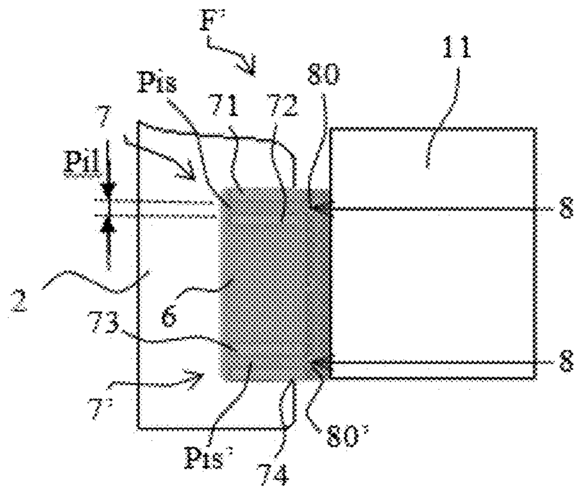
[Fig. 9]
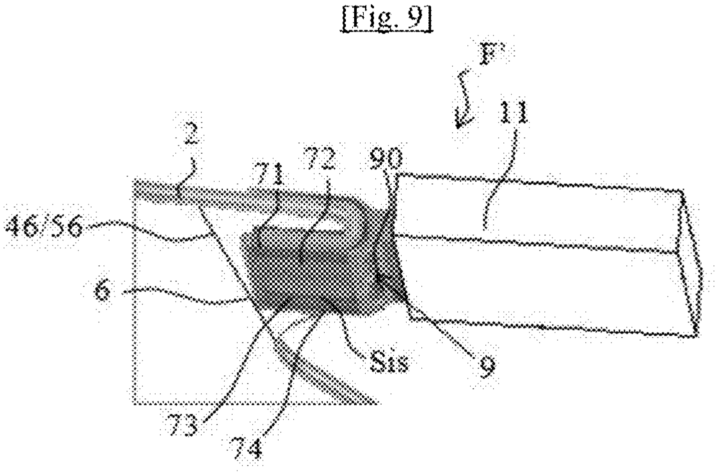
[Fig. 10]
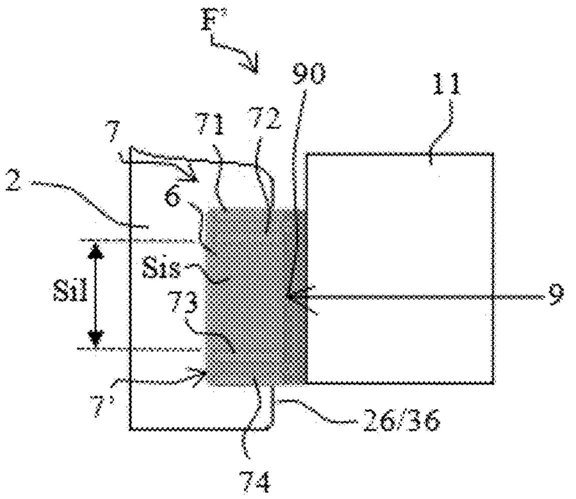

METHOD FOR MANUFACTURING A SLIDING GLAZING UNIT, AND SLIDING GLAZING UNIT

CROSS-REFERENCE TO RELATED APPLICATIONS

This application is the U.S. National Stage of PCT/FR2022/050801, filed Apr. 27, 2022, which in turn claims priority to French patent application number 2104864 filed May 7, 2021. The content of these applications are incorporated herein by reference in their entireties.

The present invention relates to a method for manufacturing a vehicle glazed unit, and in particular of a motor vehicle, including a glass pane as well as means for enabling the mobility of said glass pane in vertical translation with respect to a door of said vehicle.

The present invention also relates to a glazed unit manufactured by this method.

The present invention has been developed in particular for a door without a glazed unit frame, that is, for a door that supports the lower part of the glazed unit but that does not include a lateral jamb or a top jamb.

Many solutions have been developed to allow the vertical mobility of a glazed unit with respect to the door. However, until now, very few solutions have allowed very large control of the lateral attachment tolerance, that is, the tolerance in the exterior-interior direction (that is, the tolerance according to the general direction of the Y-axis of the vehicle).

International patent application No. WO2008074819 teaches in particular that it is possible to use two different adhesive materials to attach a glass pane to a means for allowing the mobility of the glass pane in slot translation. The second adhesive is applied in liquid form by being laterally contained by the first adhesive.

This solution is restrictive to implement due to the liquid state of the second adhesive. It can only be implemented by orienting the glazed unit vertically, in reverse, with the bottom part of the glazed unit at the top. This vertical orientation complicates the proper positioning of the glass pane in the reference frame of the reference housing, since it is then possible to use gravity only for referencing along the Z-axis of the glazed unit.

In contrast, positioning the glass pane horizontally would allow gravity to be used for referencing along the Z- and Y-axes, but this is not compatible with the liquid state of the second adhesive.

The present invention intends to propose a manufacturing method for which, contrary to the prior art, the spatial orientation of the glass pane during the attachment of the means allowing its mobility is not important.

The present invention intends to propose a manufacturing method for which the precision of the attachment of the means allowing mobility of the glass pane is very high, in particular along the Y-axis of the vehicle; a tolerance of plus or minus 0.5 mm along the Y-axis may be obtained owing to the present invention on the final glazed unit while before the attachment of the window holder it is possible for there to be significant play, of the order of 1.5 to 2 mm, between the window holder and an opposite face of the glass pane.

The present invention is based on the idea of very quickly creating a mechanical wedging of the window holder inside the U-shaped part, when the window holder is positioned in the appropriate position relative to the glass pane, in the time needed to implement chemical attachment of the window holder to the glass pane by the usual adhesive.

The present invention further aims to propose a method for manufacturing glazed units in series with a single adhesive material that is faster than previously, in particular a method for which it is not necessary to wait for the polymerization, drying or complete hardening of the adhesive in order to remove the glazed unit from the reference housing that is used for the attachment of the means allowing mobility of the glass pane.

The present invention aims to propose a glazed unit whose means allowing its mobility are attached in a more precise manner and which further has been less expensive to manufacture, since it is manufactured more quickly.

The present invention further aims to propose a glazed unit which, surprisingly, incorporates flexible material in its attachment zone(s): foam strips; on initial examination, the use of a flexible material seems incompatible with the aim of reliable and efficient attachment but, as proposed, it allows production of a compensation region for the different expansion coefficients of the various materials used for the glazed unit and for the means allowing mobility thereof.

The present invention thus relates, in its broadest sense, to a method of making a vehicle glazed unit according to claim 1. This glazed unit includes a glass pane having an external face, an internal face and a peripheral edge, as well as attachment means for allowing the mobility of said glass pane in vertical translation with respect to a door of said vehicle, said attachment means being located in at least one, and preferably two, attachment zone(s) and including a window holder having a U-shaped part. According to the method, said attachment means are attached to said glass pane by implementing at least the following steps:

- said glass pane is positioned on a reference housing, then
- two pairs of foam strips are applied and attached, each to a longitudinal rim of said attachment zone, and preferably of each attachment zone, then
- said window holder having a U-shaped part is positioned in said attachment zone such that said U-shaped part clasps a rim of said glass pane and said two pairs of foam strips, then
- a quick-hardening plastic material is injected into said U-shaped part, between the two foam strips of each pair of foam strips of said attachment zone, and preferably between the two foam strips of each pair of foam strips of each attachment zone, and
- an adhesive is injected into said U-shaped part, between said two pairs of foam strips of said attachment zone, and preferably between said two pairs of foam strips of each attachment zone.

Thus, said quick-hardening plastic material produces, as soon as it has hardened, a mechanical wedging of the position of the window holder with respect to said glass pane. It is not necessary, nor desired, for said quick-hardening plastic material to adhere chemically to said lateral extension and to said glass pane.

Said quick-hardening plastic material and said adhesive are preferably injected substantially at the same time; it is not necessary to wait for one injection to be completed to begin the others; in particular, it is not necessary to wait for the quick-hardening plastic material to be hard to inject the adhesive. The method is thus very rapid and the manufacturing cost decreases.

Said quick-hardening plastic material can be injected first because its hardening time conditions the series production rate of glazed units.

Said quick-hardening plastic material hardens, preferably, in a maximum of 60 seconds.

Preferably, the glazed unit is removed from the reference housing only after hardening of said quick-hardening plastic material so that the wedging is reliable.

Said quick-hardening plastic material is preferably a thermoplastic or thermosetting material and preferably has a hardness of at least 60 Shore A in the hardened state.

Said quick-hardening plastic material is preferably injected only between the two foam strips of each pair of foam strips of said attachment zone, and preferably injected only between the two foam strips of each pair of foam strips of each attachment zone; this material does not extend laterally. After its injection, said quick-hardening plastic material is in the form of a layer, located between the glass pane and the U-shaped part of the window holder.

Said adhesive is preferably injected only inside said U-shaped part, between said two pairs of foam strips of said attachment zone, and preferably injected only inside said U-shaped part, between said two pairs of foam strips of each attachment zone; this adhesive preferably does not extend laterally. After its injection, said adhesive is in the form of a layer, located between the glass pane and the U-shaped part of the window holder.

Said quick-hardening plastic material and said adhesive are thus separated by a foam strip, and preferably only not a foam strip. Said quick-hardening plastic material and said adhesive are therefore not in contact with one another.

A foam strip is for example a prefabricated flexible polyurethane foam tape, for example of the type used for peripheral sealing of building windows (for example, of the "compriband" registered trademark) and having the ability to compress under the effect of even a light force, and then to regain its initial shape. Each foam strip is preferably arranged between the glass pane and the window holder by producing a sealed longitudinal boundary (along the X-axis).

Optionally, said adhesive can be injected second, after complete hardening of the quick-hardening plastic material, but the series production rate of glazed units is then lower.

For better distribution of the injected material, at least one injection, and preferably each injection, is preferably carried out facing the edge of said glass pane.

Said injections (of said quick-hardening plastic material and of the totality of said adhesive) are preferably done in said reference housing: preferably without moving the glass pane between the injections, in order to allow attachment that is as fast and as reliable as possible. For the manufacture of the glazed unit, said glass pane is thus, preferably, removed from the reference housing after the injection of all of said quick-hardening plastic material and all of said adhesive.

Said foam strips are preferably applied such that they clasp a rim of said glass pane while being in contact with the glass pane.

Each pair of foam strips is preferably applied and attached to two longitudinal rims of said attachment zone by providing a primary injection space between the two strips of a pair of foam strips, said primary injection space having a length between 3.0 mm and 25.0 mm, or a volume comprised between 1 and 25 $cm^3$.

Said primary injection is preferably carried out at the center of said primary injection length Said pair of foam strips is preferably applied and attached to two longitudinal rims of said attachment zone by providing a secondary injection space between the two pairs of foam strips of said attachment zone, said secondary injection space having a length between 20.0 mm and 70.0 mm, or a volume comprised between 5 and 75 $cm^3$.

Said secondary injection is preferably carried out at the center of said secondary injection length Said quick-hardening plastic material is preferably in contact with the external face, the internal face and the edge of said glass pane.

Said adhesive is preferably in contact with the external face, the internal face and the edge of said glass pane.

Said glass pane can be monolithic, completely laminated or partially laminated.

Said glass pane is preferably partially laminated, with in a laminated part at least one exterior glass sheet, an interior glass sheet, as well as an adhesive material sheet located between said exterior glass sheet and said interior glass sheet, said attachment zone, and preferably each attachment zone, not being laminated.

The glass pane is preferably a partially laminated glass pane in the sense that there is no gas-filled space or vacuum space between the sheets that constitute the glass pane.

Advantageously, the thickness of said exterior glass sheet is between 2.85 mm and 4.85 mm.

Advantageously, the thickness of said interior glass sheet is between 0.30 mm and 2.60 mm.

In a preferred embodiment of the present invention, the thickness of said interior glass sheet is between 1.00 mm and 1.20 mm.

Advantageously, said interior glass sheet has surface stresses at most of 20 MPa, 30 MPa and 40 MPa, respectively, for a thickness of said interior glass sheet of about 1.1 mm, about 1.6 mm and about 2.1 mm. The term "about" here refers to a value considered by the person skilled in the art as a standard value, even if locally this value can vary within a range of plus or minus 10%.

At least one, and preferably each, injection is preferably carried out through said window holder by an injection hole.

Said means for enabling the mobility of said glass pane may comprise, within the meaning of the present invention, a window holder or a holder, or rails, or runners.

Said means for allowing the mobility of said glass pane preferably do not comprise holes passing partially or completely through said glass pane (that is, over a part of the thickness of a component element thereof or the totality of the thickness of this element or over a part of the thickness of the glass pane comprising several elements in this location, or even over the entirety of the thickness of the glass pane).

The present invention also relates to a vehicle glazed unit, in particular obtained by implementing the manufacturing method according to the invention, said glazed unit comprising a glass pane having an external face, an internal face and a peripheral edge, as well as attachment means for allowing the mobility of said glass pane in vertical translation with respect to a door of said vehicle, said attachment means being located in at least one, and preferably two, attachment zone(s) and comprising a window holder having a U-shaped part, said glazed unit being remarkable in that:

- two pairs of foam strips are attached, each to a longitudinal rim of said attachment zone, and preferably of each attachment zone,
- said window holder having a U-shaped part is situated in said attachment zone such that said U-shaped part clasps a rim of said glass pane and said two pairs of foam strips,
- a quick-hardening plastic material is injected through said window holder, into said U-shaped part, between the two foam strips of each pair of foam strips of said attachment zone, and preferably between the two foam strips of each pair of foam strips of each attachment zone, and an adhesive is injected through said window holder, into said U-shaped part, between the two pairs of foam strips of said attachment zone, and preferably between the pairs of foam strips of each attachment zone.

Preferably, at least one, and preferably each, window holder includes, at least one, preferably two, and more preferably three, injection holes(s).

In the present document, when it is explained that a part or U shape clasps a rim of the glass pane, it should be understood that the inside of the part or U shape follows the general shape of the two opposite faces and the edge of the glass pane; there is no complete contact of the entire part or U shape with the two opposite faces and the edge of the glass pane because there is a space between them for the adhesive, the foam strips and the quick-hardening plastic material.

In the present document, for the mentioned ranges, the limits of the ranges are included in the ranges.

The expression “edge” or “end face” designates the narrow side of a sheet, which is located substantially transversely between the two main faces of a sheet.

Thus, the method for manufacturing the glazed unit according to the invention is easier to implement because the glass pane can be held in the reference housing in any position, and in particular in the most suitable position with respect to gravity while being faster to implement since it is not necessary to wait for the polymerization or the drying or the complete hardening of the adhesive to remove the glazed unit from the reference housing; it is sufficient to wait for the hardening of the quick-hardening plastic material.

The present invention has been developed for glazed units incorporated in doors not having lateral jambs or an upper jamb at the glazed unit when the latter is raised (closed).

Advantageously, especially, the present invention enables production of a glazed unit with means allowing its mobility which are attached to the glass pane with very high precision, in particular along the Y-axis, and very high reliability, while being light and allowing differential expansion (compensation for different expansion coefficients).

The present invention will be better understood from reading the detailed description hereinafter of non-limiting exemplary embodiments and from the appended figures:

FIG. 1 shows an interior front view of a monolithic front movable vehicle glazed unit according to one embodiment of the invention with two window holders;

FIG. 2 shows a schematic perspective view of a reference housing at the beginning of the manufacturing method according to the invention for a partially laminated glass pane;

FIG. 3 shows another schematic perspective view of a reference housing at the beginning of the manufacturing method according to the invention;

FIG. 4 shows a schematic top view of the partially laminated glass pane after application of the foam strips;

FIG. 5 shows a partial perspective view of an attachment zone of the glass pane for partially laminated after application of the foam strips;

FIG. 6 shows a partial perspective bottom view of the injection of the quick-hardening plastic material;

FIG. 7 shows a partial perspective bottom view of attachment zone of the partially laminated glass pane before injection of a quick-hardening plastic material;

FIG. 8 shows a partial bottom view of the injection of the quick-hardening plastic material;

FIG. 9 shows a partial perspective bottom view of an attachment zone of the partially laminated glass pane before injection of an adhesive; and FIG. 10 shows a partial bottom view of the injection of the adhesive.

It is noted that the proportions between the various elements shown in the figures have been respected for each figure independently, in order to facilitate the reading thereof.

FIG. 1 shows a left side glazed unit 1 of a vehicle, according to one embodiment of the invention, considered as being seen from the interior of this vehicle.

It is in particular a lateral glazed unit of a door of a motor vehicle (not visible in [FIG. 1]) that can be moved in translation with respect to this door substantially according to the vertical between an open position wherein the glazed unit is located entirely or almost entirely in the interior of the door and a closed position wherein the glazed unit closes a glass pane opening of the door.

Thus, in a closed position, this glazed unit embodies a vertical separation between an interior space I that is in the interior of the vehicle and an exterior space E that is on the exterior of the vehicle.

The notions “exterior” and “interior” are therefore respectively considered in the present document with respect to this exterior space E and this interior space I.

As it concerns a lateral glazed unit, the latter for the most part extends according to the axis generally referred to as the “X-axis” of the vehicle, which is the central longitudinal axis of the advance of the vehicle equipped with the glazed unit according to the invention as a lateral glazed unit on the left side of the vehicle and which corresponds to the horizontal axis in the plane of the sheet in [FIG. 1].

The mobility of the glazed unit relative to the door is essentially vertical in the sense that this mobility takes place along the Z-axis, optionally with a small component along the transverse axis Y not shown in [FIG. 1].

In the embodiments shown, the glazed unit 1 is in one piece.

In [FIG. 1], the glazed unit 1 includes a glass pane 2' which is monolithic: it consists of a single sheet of glass or plastic material, preferably glass.

In the remainder of the description, with reference to FIGS. 2 to 10, it is chosen to describe the application of the invention to the most complex glazed unit configuration 1: when the glazed unit includes a glass pane 2, which is curved (that is, non-flat) and partially laminated.

The glass pane 2, 2' has a first lateral rim 23, a second lateral rim 24, a top rim 25 and a bottom rim 26. The first lateral rim 23 and the second lateral rim 24 of the glass pane are arranged respectively in the part of the glass pane oriented toward the front and in the part of the glass pane oriented toward the rear of the vehicle. The top rim 25 and the bottom rim 26 of the glass pane are arranged in the part of the glass pane oriented toward the roof and in the part of the glass pane oriented toward the ground on which the vehicle rests.

The partially laminated glass pane 2 includes a main part which is laminated. In this laminated part, the glass pane includes, from the exterior to the interior, at least, in this order: an exterior glass sheet 3, an adhesive interlayer 4 then an interior glass sheet 5; however, it is possible for at least one other sheet to be inserted between the exterior glass sheet 3 and the adhesive interlayer 4 or between the adhesive interlayer 4 and the interior glass sheet 5. The adhesive material interlayer sheet 4 and the exterior glass sheet 3 are seen by transparency through the interior glass sheet 5 in FIG. 2.

In the laminated part, the exterior glass sheet 3 has an exterior face 30 that is oriented toward the exterior space E, an interlayer face 32 that is oriented toward the adhesive interlayer 4, and a peripheral edge 31 that is located between these two faces. Furthermore, the exterior glass sheet 3 has a first lateral rim 33, a second lateral rim 34, a top rim 35 and a bottom rim 36. The first lateral rim 33 and the second lateral rim 34 of the exterior glass sheet 3 are arranged in the part of the exterior glass sheet 3 oriented toward the front and in the part of the exterior glass sheet 3 oriented toward the rear of the vehicle. The top rim 35 and the bottom rim 36 of the exterior glass sheet 3 are arranged in the part of the exterior glass sheet 3 that is oriented toward the roof and in the part of the exterior glass sheet 3 that is oriented toward the chassis of the vehicle.

The interior glass sheet 5 has an interlayer face 50 that is oriented toward the adhesive interlayer 4, an interior face 52 that is oriented toward the interior space I and a peripheral edge 51 that is located between these two faces. Furthermore, the interior glass sheet 5 has a first lateral rim 53, a second lateral rim 54, a top rim 55 and a bottom rim 56. The first lateral rim 53 and the second lateral rim 54 of the interior glass sheet 5 are arranged respectively in the part of the interior glass sheet 5 that is oriented toward the front and in the part of the interior glass sheet 5 that is oriented toward the rear of the vehicle. The top rim 55 and the bottom rim 56 of the interior glass sheet 5 are arranged respectively in the part of the interior glass sheet 5 that is oriented toward the roof and in the part of the interior glass sheet 5 that is oriented toward the chassis of the vehicle.

The adhesive interlayer 4 has an exterior interlayer face 40 that is oriented toward the interlayer face 32 and that herein makes contact with this interlayer face 32, an interior interlayer face 42 that is oriented toward the interlayer face 50 and that herein makes contact with this interlayer face 50, as well as a peripheral edge 41 that is located between these two interlayer faces 40, 42. Furthermore, the adhesive material interlayer sheet 4 has a first lateral rim 43, a second lateral rim 44, a top rim 45 and a bottom rim 46. The first lateral rim 43 and the second lateral rim 44 of the adhesive interlayer sheet 4 are arranged respectively in the part of the adhesive material interlayer sheet 4 that is oriented toward the front and in the part of the adhesive interlayer sheet 4 that is oriented toward the rear of the vehicle. The top rim 45 and the bottom rim 46 of the adhesive interlayer sheet 4 are arranged in the part of the adhesive material interlayer sheet 4 that is oriented toward the roof and in the part of the adhesive material interlayer sheet 4 that is oriented toward the chassis of the vehicle.

The exterior glass sheet 3 is a glass sheet having undergone a hot-bending operation before the manufacture of the partially laminated glass pane 2, having a thickness between 2.85 and 4.85 mm, for example 3.50 mm. The exterior glass sheet 3 may have surface stresses of at least 80 MPa while being less than 200 MPa.

The interior glass sheet 5 may be a glass sheet having undergone a thermal tempering or semi-tempering operation and having a thickness between 0.70 and 2.60 mm, or even between 0.70 and 2.50 mm, or even between 0.70 and 2.30 mm, or even between 0.70 and 2.10 mm, for example 1.10 mm or 1.60 mm. The tempering or semi-tempering operations have the advantage of being very rapid to perform. Indeed, on average, approximately 20 sheets of glass can be produced in one minute. Furthermore, the tempering or semi-tempering operation allows surface stresses to be introduced in the order of 20 MPa, 30 MPa and 40 MPa, respectively, on a glass sheet having a thickness of about 1.10 mm, about 1.60 mm and about 2.10 mm.

In a variant, the interior glass sheet 5 may be a glass sheet having undergone a chemical tempering operation and having a thickness between 0.30 and 1.60 mm, or even between 0.50 and 1.50 mm, or even between 0.70 and 1.20 mm, for example 1.10 mm. A chemical tempering operation allows surface stresses of at least 200 MPa to be introduced.

The adhesive material interlayer 4 is for example a sheet made of polyvinyl butyral (PVB) having a thickness comprised between 0.30 and 1.50 mm, for example of 0.78 mm. This adhesive material sheet 4 preferably has the same length dimension according to the X-axis and height dimension according to the Z-axis as the interior glass sheet 5.

In the case where the glass pane 2 includes one or more other sheets in addition to the three mentioned previously, the exterior glass sheet 3 is the outermost sheet of the laminated glass pane.

FIG. 2 shows that the glass pane 2 has an exterior face 20 that is embodied by the exterior face 30 of the exterior glass sheet 3, an interior face 22 that is embodied by the interior face 52 of the interior glass sheet 5 and a peripheral edge 21 located between these two faces, corresponding to the peripheral edge 31 of the exterior glass sheet 3, to the peripheral edge 41 of the adhesive material sheet 4 and to the peripheral edge 51 of the interior glass sheet 5.

In [FIG. 1] and [FIG. 2], the dashed line, called "line of sight" or "limit of sight" VL, shows the top of the shell of the door inside which the glazed unit 1 slides. When the glazed unit is considered vertically, this line of sight VL creates a separation between, on the one hand, a hidden part of the glass pane HP that is located below the line of sight VL and that is intended to be hidden inside the door regardless of the position of the glass pane relative to said door and, on the other hand, a visible part of the glass pane VP that is located above the line of sight VL.

In the hidden part of the glazed unit, under the line VL, the glazed unit has one, and preferably here two, attachment zones F, F', each zone being intended to accommodate means for allowing the mobility of the glass pane in vertical translation with respect to a door of the vehicle. In the finished glazed unit, each attachment zone F, F' includes a window holder 6, 6' that is attached to the glass pane, as explained in more detail below.

The glazed unit thus includes, in addition to the glass pane 2, 2' along at least part of at least one bottom rim 26, at least one window holder that is intended to accommodate a securing element, not shown, which has the purpose of allowing the window holder to be attached in a movement system to raise and lower the glazed unit. On this subject, some documents talk of a "regulator" system.

The glazed unit, in its use configuration, thus preferably includes two glass pane holders.

In the configurations shown in [FIG. 2] to [FIG. 10], each attachment zone F, F' is not laminated in the totality of the zone: at least one of the three elements which at least partially compose the lamination in the laminated part is not present in the totality of this (or these) attachment zone(s). However, the glass pane 2 could, of course, be completely laminated and thus also be laminated in the attachment zone F, F'.

In the configurations shown in [FIG. 2] to [FIG. 10], only the exterior glass sheet 3 is present in each non-laminated attachment zone F, F'; the interior glass sheet 5 and the adhesive material sheet 4 are both absent; The adhesive material sheet 4 could be present, but this produces an extra thickness that is not necessary.

To produce a non-laminated attachment zone F, F', the bottom rim 56 of the interior glass sheet 5, as well as the bottom rim 46 of the adhesive material sheet 4, are much higher than the bottom rim 36 of the exterior glass sheet 3. The bottom rim 56 of the interior glass sheet 5 and the bottom rim 46 are located approximately midway along the vertical between the line of sight VL and the bottom rim 36 of the exterior glass sheet 3.

Preferably, no attachment zone F, F' of the glazed unit includes an attachment hole.

The two window holders 6, 6' are not necessarily strictly identical, but each substantially has, in cross section, a U shape that clasps a longitudinal part of the bottom rim 26, and more precisely a longitudinal part of the bottom rim 36 of the exterior glass sheet 3, without being in contact itself with the adhesive material sheet 4, or the interior glass sheet 5.

In the embodiment shown here, the means for allowing the mobility of the glass pane 2, 2' in translation relative to a door of the vehicle comprise at least one and preferably at least two window holder(s) 6, 6' substantially having, in cross section, an inverted h shape or a tuning fork shape, that is, a U shape with a tail that extends opposite the two lateral walls of the U-shaped part.

The (or each) window holder may be made of plastic, for example polyamide, polybutylene terephthalate, or metal alloy, for example aluminum alloy.

Each window holder 6, 6' thus has, as can be seen more particularly in [FIG. 3]:

- a first part consisting of two parallel walls 63, 64 that are connected at their base and forming a longitudinal groove, that is, forming a U shape in transverse cross section, and
- a second part consisting of a tail 65, extending opposite from the walls 63, 64 with respect to the base connecting these walls.

The tail 65 is intended to be connected to a motorized driving system, which is not shown, in order to allow the glazed unit 1 to be raised and lowered in the door of the vehicle. This h shape of the window holder is particularly advantageous because it allows the transmission of forces between the window holder and the glass pane along a large area corresponding to the sum of the interior surfaces of the walls 63, 64.

The assembly is performed so that said walls 63, 64 of said h shape clasp the lower part of said glass pane 2, 2' the tail 65 then being located substantially in the projection of the glass pane 2, 2'.

More specifically, for the partially laminated glass pane 2, the U-shaped part clasps the bottom rim 36 of the exterior glass sheet 3, and only this bottom rim 36; it does not clasp the bottom rim 56 of the interior glass sheet 5 and preferably also does not clasp the bottom rim 46 of the adhesive material sheet 4.

The assembly of the monolithic glass pane 2' or the partially laminated glass pane 2 is performed on a reference housing 10 allowing tolerances on the window holder/glass pane assembly to be controlled.

Before positioning and attaching the window holders, in a first step, the glass pane is correctly positioned ("focused") in a mounting template having a plurality of positioning stops Y1, Y2, Y3, Y4, Z1, Z2, Z3 which represent the nominal shape plane of the glass pane on the vehicle.

The positioning stops that are essentially according to the Y-axis: Y1, Y2, Y3, Y4, are located on vertical jambs, respectively RY1, RY2, RY3, RY4.

The positioning stops that are essentially according to the Z-axis; Z1, Z2, Z3, are situated at the rim of vertical jambs, respectively RZ1, RZ2, RZ3.

Once the glass pane 2 is correctly positioned and held in the reference housing 10, as shown in [FIG. 2] and [FIG. 3], an operator or the articulated arm of a robot proceeds with the second step of the method, visible in [FIG. 4] and [FIG. 5]: in each attachment zone F, F', four foam strips 71, 72, 73, 74 are grasped and are positioned in pairs 7, 7' such that two pairs 7, 7' of foam strips are applied and attached, each to a longitudinal rim of each attachment zone F, F'. For the glazed unit 1, there are therefore eight foam strips 71, 72, 73, 74.

Each foam strip 71, 72, 73, 74 is applied such that it clasps a rim of the glass pane 2: each foam strip 71, 72, 73, 74 is applied and bonded against the external face 20, against the edge 21 and against the internal face 22 in the attachment zone.

Each foam strip is preferably a single piece, since it is easier to position, but in absolute terms, each foam strip can be made in several parts. It is prefabricated and has, before application to the surface of the glass pane, a thickness sufficient to allow the lateral sealing (according to the Y-axis or according to the Z-axis specifically facing the edge of the glass pane) between the glass pane and the window holder, optionally by compressing a little.

Each foam strip has a length (according to the X-axis) of about 2.0 to 10.0 mm, for example, 5.0 mm.

Once positioned and attached, for example by bonding, to the glass pane 2, each foam strip is intended to remain and is present in the finished glazed unit 1 (ready to be installed in a door or installed in this door).

In a third step, shown in [FIG. 6], each window holder is positioned in the attachment zone F, F' opposite the bottom rim of the glass pane such that the U-shaped part clasps the bottom rim 26 of said glass pane and the two pairs 7, 7' of foam strips.

During this step, the foam strips are compressed on the one hand laterally (according to the Y-axis) between the faces 20, 22 of the glass pane 2 and the walls 63, 64 of the U shape, and on the other hand at the bottom, between the edge 21 of the glass pane 2 and the bottom of the U shape.

The correct positioning of the window holder 6, 6', relative to the glass pane 2, is achieved by means of a window holder support 11, 11'. This positioning is the desired final positioning in the final glazed unit.

Each foam strip is intended to produce a sealed longitudinal boundary (according to the X-axis) for the material subsequently injected.

For each attachment zone, there are thus three injection spaces:

- two primary injection spaces Pis, made between the two foam strips of each pair of foam strips, that is, on the one hand between the foam strip 71 and the foam strip 72 of the pair of foam strips 7, and on the other hand between the foam strip 73 and the foam strip 74 of the pair of foam strips 7'
- a secondary injection space Sis, produced between the two pairs 7, 7' of foam strips, that is, between the foam strip 72 and the foam strip 73.

Each injection space is U-shaped and clasps the bottom rim of the glass pane.

The (or each) primary injection space Pis has a length Pil (according to the X-axis) of between 3.0 mm and 25.0 mm, for example 8.0 mm; or a volume Piv of between 1 and 25 $cm^3$.

The secondary injection space Sis has a length Sil (according to the X-axis) of between 20.0 mm and 70.0 mm, for example 30.0 mm, or a volume Siv of between 5 and 75 $cm^3$.

In a fourth step, shown in [FIG. 7] and [FIG. 8], a quick-hardening plastic material 8 is injected, inside the U-shaped part of the window holder, at the same time:

- between the two foam strips 71, 72; 73, 74 of each pair, respectively 7; 7' of foam strips, and
- between the glass pane 2 and the inner face of the U-shaped part of the window holder.

In this step, it is thus a question of filling each primary injection space Pis.

The quick-hardening plastic material 8 may for example be a material hardening in 60 seconds or less. Here, it is a thermoplastic or thermosetting material and it preferably has a hardness of at least 60 Shore A in the hardened state. It may in particular be a thermoplastic elastomer (TPE), a Polyamide, etc. This is in particular a "hotmelt Tecbond 240-12-300" material.

The primary injection (or each primary injection) is carried out at the center of the primary injection length Pil so that the injected material is correctly distributed in the primary injection volume. This primary injection (or each primary injection) is carried out through the wall of the window holder, by an injection hole 80, 80'. These injection holes 80, 80' are located in the base of the U shape, in order allow injections to be produced facing the edge 21 of the glass pane 2 and so that the injected material is then distributed correctly in the primary injection volumes.

For a window holder, the two primary injections are preferably carried out at the same time in order to reduce the total duration of the manufacturing method and to distribute the forces due to injections on each side of the window holder. For a glazed unit with two window holders, the four primary injections are preferably carried out at the same time in order to reduce the total duration of the manufacturing method.

In a fifth step, shown in [FIG. 9] and [FIG. 10], an adhesive 9 is injected into said U-shaped part between the two pairs 7, 7' of foam tape, in the secondary injection volume, between the foam strip 72 and the foam strip 73.

This fifth step is preferably carried out at the same time as the fourth step; it is not necessary for the quick-hardening plastic material 8 to be hard in order to proceed with the injection of the adhesive 9.

The secondary injection is carried out at the center of the primary injection length Pil, that is, at the center of the distance between the foam strip 72 and the foam strip 73, so that the injected material is correctly distributed in the secondary injection volume. This secondary injection is carried out through the wall of the window holder, by an injection hole 90. This injection hole 90 is located in the base of the U shape, in order to allow the injection to be carried out on the face of the edge 21 of the glass pane 2 and so that the injected material is then distributed correctly in the secondary injection volume.

The adhesive 9 is for example a thermosetting resin, for example based on polyurethane, mono- or bi-component, with or without accelerator. The hardening time of the adhesive is of little importance, and it may be long because the window holder is already correctly attached to the glass pane by the quick-hardening plastic material 8.

From the first to the fifth step, the glass pane 2 is held in the reference housing 10 without moving. After this fifth step, once the primary and secondary injections are finished and the quick-hardening plastic material 8 is sufficiently hard (not necessarily completely hard), the glazed unit 1 can be immediately removed from the reference housing 10; it is not necessary to wait for the polymerization or the hardening of the adhesive 9.

The window holder 6, 6' thus has:

- at least two injection holes: an injection hole 80 for the quick-hardening plastic material 8 and an injection hole 90 for the adhesive 9;
- at least three injection holes: two injection holes 80, 80' for the quick-hardening plastic material 8 and an injection hole 90 for the adhesive 9.

All the injections are thus carried out through the window-holder 6, 6' by the injection holes 80, 80', 90. By analyzing the finished glazed unit 1, it is possible to observe that the quick-hardening plastic material 8 as well as the adhesive 9 were injected through the window holder 6, 6' because material injected into the holes 80, 80', 90 may remain.

Advantageously, there is no upper boundary (along the Z-axis) for the injected materials. Monitoring the injection and the amount injected is sufficient to control that all of the primary and secondary injection spaces are filled with the injected materials.

In absolute terms, it could be envisaged that at least one, or each, injection is carried out by the opening at the top of the U-shaped shape of the window holder; however, the injection is then more difficult to control because the air present in the injection spaces must be expelled during the injection.

Due to the geometric deviations of the glass panes 2, 2' of the same series in the attachment zone F, F', the thickness of the adhesive 9 is not uniform from one glazed unit to the other of the same series and varies based on the actual geometry of each glass pane in the attachment zone. The quick-hardening adhesive material 8 allows fixing of the specific position of the window holder and of the glass pane, which may be different for each glazed unit of a same series, in the time that the adhesive 9 performs chemical adhesion between the window holder and the glass pane.

The quick-hardening adhesive material 8 in particular allows fixing of the position according to the Y-axis with very high precision, taking into consideration that the shape of the glass pane itself according to this Y-axis varies from one glass pane to the other for the same series of glazed units.

Thus, the physical wedging of the window holder to the glass pane 2, 2' by the plastic material 8 is done quickly and is reliable; the chemical attachment by the adhesive 9 can be done without risk of the window holder moving towards the glass pane. This chemical attachment is reliable and precise; it is not necessary to complement it with a mechanical attachment of the window holder to the glass pane.

In the same series of glazed units (intended for the same type of vehicle), the final position of the window holders depends on the actual configuration of each window, and this final position is first fixed by the quick-hardening plastic material 8, then by the adhesive 9.

Although this is not desired because it adds an additional step, it is possible to provide for a window holder, and in particular its tail 65, to be subsequently retouched, such that its configuration is modified, as taught for example in international patent application No. WO200598187.

In a variant that is not shown, the edge 51 of the interior glass sheet 5 and the edge 41 of the adhesive material sheet 4 are located below the edge 31 of said exterior glass sheet 3 in order to form an interior offset having a width extending in the centripetal direction, and this interior offset is particular since it is not completely peripheral; it does not extend along the totality of the periphery of the glass pane: in at least one hidden alignment zone, there is no interior offset and the edge 51 of said interior glass sheet 5 and the edge 41 of said adhesive material sheet 4 are both in the lateral projection of the edge 31 of the exterior glass sheet 3; this hidden alignment zone is located in the hidden part of the glass pane HP such that it remains permanently hidden inside the shell of the door, regardless of the position of the glazed unit with respect to this door (glazed unit open or closed or in an intermediate position between the two).

Thus, in this variant, the entire part of the glazed unit that is located below the limit of sight VL may not include an interior offset: in this part below the limit of sight VL, inside the shell of the door when the glazed unit is closed, it is possible for the edge 31 of the exterior glass sheet 3 over one (or several) part(s) of its length, or even over the entirety of its length, to be aligned with the edge 51 of the interior glass sheet 5, or it is even possible for the edge 31 of the exterior glass sheet 3 over one (or several) part(s) of its length, or even over its entire length, to extend farther, in the centrifugal direction, than the edge 51 of the interior glass sheet 5.

It is for example possible for the edge 51 of the interior glass sheet 5 to be aligned with the edge 31 of the exterior glass sheet 3 only in the places where the means for allowing the movement of the glass pane 2 in translation with respect to a door of the vehicle are located.

Above the limit of sight VL, the door of the vehicle may include at least one part with no jamb. Thus, it is possible for the door:

- to not include a front lateral jamb and for it to be the adjacent body part, also called "A-pillar," that guides the glazed unit; and/or
- to not include a rear lateral jamb and for it to be the adjacent body part, also called "B-pillar," that guides the glazed unit.

The present invention is described in the preceding text by way of example. Of course, those skilled in the art are capable of implementing different variants of the invention without departing from the scope of the patent such as defined by the claims.

The invention claimed is:

1. A method for manufacturing a vehicle glazed unit, including a glass pane having an external face, an internal face and a peripheral edge, as well as an attachment system configured to allow mobility of said glass pane in vertical translation with respect to a door of a vehicle, said attachment system being located in at least one attachment zone and including a window holder having a U-shaped part, wherein said attachment system is attached to said glass pane by implementing at least the following steps:

positioning said glass pane on a reference housing, then, applying and attaching two pairs of foam strips, each to a longitudinal rim of said attachment zone, then positioning said window holder having a U-shaped part in said attachment zone such that said U-shaped part clasps a rim of said glass pane and said two pairs of foam strips, then injecting a quick-hardening plastic material into said U-shaped part, between the two foam strips of each pair of foam strips of said attachment zone, and injecting an adhesive into said U-shaped part, between said two pairs of foam strips of said attachment zone.

2. The method according to claim 1, wherein said quick-hardening plastic material and said adhesive are injected substantially at the same time.

3. The method according to claim 1, wherein said quick-hardening plastic material is a thermoplastic or thermosetting material.

4. The method according to claim 3, wherein said quick-hardening plastic material has a hardness of at least 60 Shore A in the hardened state.

5. The method according to claim 1, wherein at least one injection is carried out facing the edge of said glass pane.

6. The method according to claim 5, wherein each injection is carried out facing the edge of said glass pane.

7. The method according to claim 1, wherein said injections are carried out in said reference housing.

8. The method according to claim 1, wherein each pair of foam strips is applied and attached to two longitudinal rims of said attachment zone by providing a primary injection space between the two strips of a pair of foam strips, said primary injection space having a length between 3.0 mm and 25.0 mm, or a volume comprised between 1 and 25 $cm^3$.

9. The method according to claim 1, wherein each pair of foam strips is applied and attached to two longitudinal rims of said attachment zone by providing a secondary injection space between the two pairs of foam strips of said attachment zone, said secondary injection space having a length of between 20.0 mm and 70.0 m, or a volume comprised between 5 and 75 $mm^3$.

10. The method according to claim 1, wherein said quick-hardening plastic material is in contact with the external face, the internal face and the peripheral edge of said glass pane.

11. The method according to claim 1, wherein said adhesive is in contact with the external face, the internal face and the peripheral edge of said glass pane.

12. The method according to claim 1, wherein said glass pane is partially laminated, a laminated part comprising at least one exterior glass sheet, an interior glass sheet, as well as an adhesive material sheet located between said exterior glass sheet and said interior glass sheet, said attachment zone not being laminated.

13. The method according to claim 1, wherein at least one injection is carried out through said window holder by an injection hole.

14. The method according to claim 1, wherein the attachment system is located in at least two attachment zones.

15. The method according to claim 14, wherein the two pairs of foam strips are applied and attached, each to a longitudinal rim of each attachment zone.

16. The method according to claim 14, wherein the quick-hardening plastic material is injected into said U-shaped part, between the two foam strips of each pair of foam strips of each attachment zone.

17. The method according to claim 14, wherein the adhesive is injected into said U-shaped part, between said two pairs of foam strips of each attachment zone.

18. The method according to claim 14, wherein each attachment zone is not laminated.

19. A vehicle glazed unit, said vehicle glazed unit including a glass pane having an external face, an internal face and a peripheral edge, as well as an attachment system configured to allow mobility of said glass pane in vertical translation with respect to a door of a vehicle, said attachment means system being located in at least one attachment zone and including a window holder having a U-shaped part, wherein:

two pairs of foam strips are attached, each to a longitudinal rim of said attachment zone, said window holder having a U-shaped part is situated in said attachment zone such that said U-shaped part clasps a rim of said glass pane and said two pairs of foam strips, a quick-hardening plastic material is injected through said window holder, into said U-shaped part, between the two foam strips of each pair of foam strips of said attachment zone, and an adhesive is injected through said window holder, into said U-shaped part, between the two pairs of foam strips of said attachment zone.

20. The vehicle glazed unit according to claim 19, wherein at least one window holder includes at least one injection holes.

* * * * *